Figure 1:
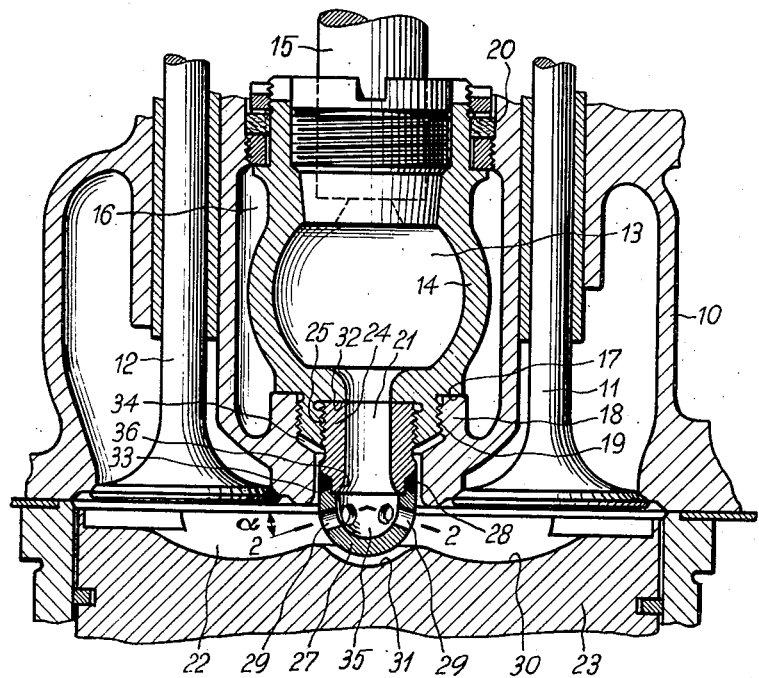

Sept. 3, 1957  O. SCHILLING  2,804,858
PRECOMBUSTION DIESEL ENGINE
Filed Sept. 1, 1953  2 Sheets-Sheet 1

INVENTOR
OTTO SCHILLING.

BY *Dicke and Craig.*

ATTORNEYS.

United States Patent Office 2,804,858
Patented Sept. 3, 1957

2,804,858

PRECOMBUSTION DIESEL ENGINE

Otto Schilling, Stuttgart-Unterturkheim, Germany, assignor to Daimler-Benz Aktiengesellschaft, Stuttgart-Unterturkheim, Germany Application September 1, 1953, Serial No. 377,773

Claims priority, application Germany September 4, 1952

14 Claims. (Cl. 123—32)

This invention relates to a precombustion-chamber type diesel engine with an insert projecting into the main combustion chamber which has a restricted duct-shaped portion communicating preferably by means of throttle openings serving as outlet openings, with the main combustion chamber.

It is the principal object of the present invention to provide an insert which is economical to manufacture, insures a greater life, and otherwise is well adapted for the purpose for which the same is intended.

A feature of the present invention therefore consists in a construction in which the insert is formed of two parts, in that the part preferably containing the outlet or throttle openings and located adjacent to the main combustion chamber is welded to the remainder of the insert. It is preferably made of high-grade material and is preferably only through the remainder of the insert in connection with the wall of the cylinder head. The remainder of the insert, as it is subjected to but low thermal loads, may be made of cheaper, more common material.

In the known precombustion chambers with a contracted duct-shaped portion and outlet openings spaced about the perimeter thereof there occurs, moreover, with a most favorable diameter of the chamber throat, a relatively strong, undesirable throttling in the outlet openings if the walls between the openings are not to be so weakened by larger outlet openings that the service life of the insert is thereby endangered.

A further object of the present invention therefore consists in so constructing the precombustion chamber or the insert forming the communication duct between precombustion chamber and main combustion chamber as to insure not only a sufficiently great service life of the insert but also that no excessive throttling can take place in the radially directed outlet openings or gas passages spaced about the perimeter thereof.

A further feature of the present invention therefore resides in having an enlargement between the chamber throat formed by the insert and the outlet openings spaced about the perimeter of the insert and serving as throttle openings, this enlargement being so stepped back as to have a larger diameter than the chamber throat, with the outlet openings or gas passages running essentially radially therefrom.

With this arrangement a sufficient number of gas passages having a sufficiently large cross-sectional area may be provided without the danger of a burning through of the insert bottom in the plane of the gas passages.

According to another feature of the invention the enlargement is formed as full or partial sphere, for example, hemisphere and preferably formed by the insert member welded to the remainder thereof which is located adjacent to the main combustion chamber. An extremely high temperature level can be attained thereby in connection with a maximum service life of the insert.

A further object of the present invention is the prevention of losses in rate of flow in the communication duct as well as in the outlet openings or gas passages spaced about the perimeter of the insert.

A further object of the present invention resides in the provision of an insulation of the insert members, adapted to provide for a high temperature in the chamber throat and for a good combustion.

A still further object of the invention is the provision of a construction offering a simple, suitable assembly of the insert parts.

Figure 2:
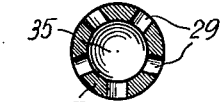
Figure 3:
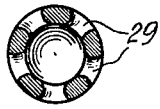
Figure 4:
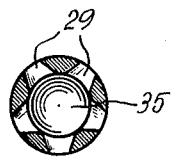
Figure 5:
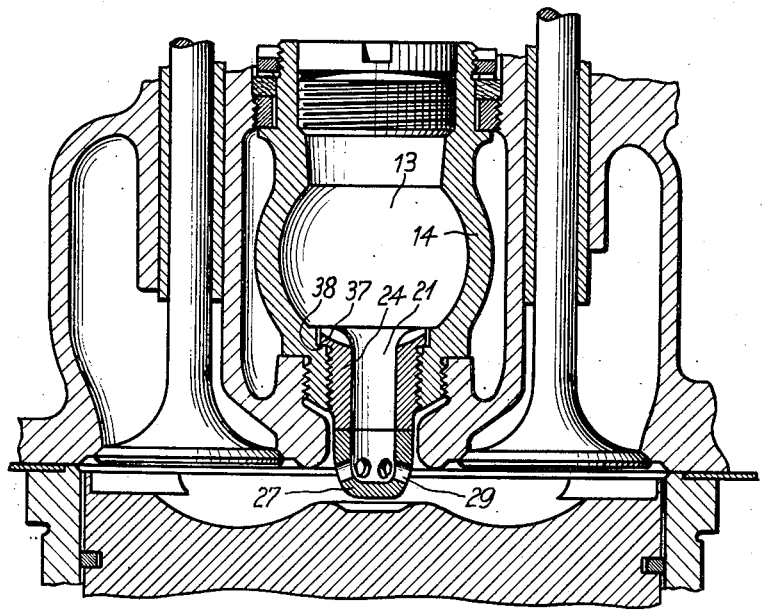

The foregoing and other objects and features of the invention will become apparent from the following description of several embodiments thereof, reference being had to the accompanying drawings wherein:

Fig. 1 is a sectional view through the cylinder head with a precombustion chamber according to the invention, Fig. 2 is a sectional view taken in the plane 2—2 of Fig. 1 illustrating one embodiment, Fig. 3 is a view similar to Fig. 2 illustrating a second embodiment, Fig. 4 is a further view similar to Fig. 2 illustrating a third embodiment of the precombustion chamber insert, and Fig. 5 is a sectional view illustrating a modification of the precombustion chamber.

In the form of the invention according to Fig. 1 a precombustion chamber 13 is centrally arranged over the cylinder space in the cylinder head 10 between intake valve 11 and exhaust valve 12. The precombustion chamber is formed by an insert 14 which accommodates the fuel injection nozzle 15 and is directly cooled by the cooling water in the cooling water jacket 16. The insert 14 is seated by means of a shoulder with a sealing surface 17 upon an annularly protruding rim of the end wall of the cylinder head adjacent to the cylinder space and is threadedly secured therein by means of the screw thread 19. At its upper end, the insert 14 is secured by a lock nut supported upon the shoulder thereof, with the thread of the nut sealed by a packing 20.

The precombustion chamber 13 communicates through a throat 21 with the main combustion chamber 22 which is formed by a dish-shaped depression in the crown of the piston 23. The chamber throat 21 is formed by an insert consisting of an upper member 24 threadedly secured by means of the screw thread 25 to the annular portion 26 of the insert 14 and a lower member 27 which is welded at 28 to the upper member 24 and contains the outlet openings 29 to the main combustion chamber spaced about its perimeter. The lower insert member 27 closes the chamber throat 21 toward the piston crown or head and is essentially hemispherical in shape. It is suitably made of high-grade steel, whilst the upper insert member 24 may be made of material of somewhat lower quality. The outlet openings 29, of which five are provided in the illustrated embodiments, are inclined toward the piston crown, which in its outer extremities has an annular depression 30 into which issues the charge of the precombustion chamber blown through the outlet openings 29 in about tangential direction. The crown of the piston 23 is in its center provided with a local depression 31 into which protrudes the bottom of the insert member 27 in the upper dead center position of the piston.

The insert composed of the members 24 and 27 is only in contact with the surrounding wall or with the directly cooled precombustion chamber insert 14 through the screw thread 25 and through the upper shoulder 32, whilst otherwise it is insulated against the surrounding wall by an annular gap 33 which is in communication with the insulating space 34 formed between the annular shoulder of the insert 14 and the lower wall of the cylinder head.

Within the lower insert member 27, the chamber throat 21 is enlarged by means of the nozzle-shaped wall 36 to form an essentially hemispherical space, and the outlet openings 29 are radially bored in the lower portion thereof. In the embodiments according to Figs. 1 and 2, the several openings 29 are cylindrical in shape, whilst in Fig. 3 they are outwardly enlarged and in Fig. 4 outwardly contracted in the form of a nozzle.

By reason of the enlargement 35 a sufficiently large cross section can be provided in the passages 29 for the outstreaming gases by the arrangement of a sufficient number of bores, without the bores being spaced too close together and the webs between the bores becoming too weak.

The embodiment according to Fig. 5 differs from those according to Figs. 1–4 only in this respect that the chamber throat has the same diameter throughout down to the bottom of the insert 27. Hence, no provision for an enlargement is made. In this case there are also fewer outlet openings or gas passages, in that, for example, only four bores 29 are provided instead of five. Furthermore, the member 24 of the lower insert is provided with a shoulder 37 which establishes the lower limits of the main portion 13 of the precombustion chamber and is supported upon a corresponding shoulder 38 on the upper insert 14.

It will be obvious that various modifications may be made in the embodiments above described without in any way departing from the spirit of the invention as defined in the appended claims.

What is claimed is:

1. A precombustion-chamber type diesel engine comprising a main combustion chamber, a precombustion chamber, an insert between said precombustion and said main combustion chambers forming a communicating duct therebetween, said communicating duct being open at one end thereof and in direct free communication thereat with said precombustion chamber, and said insert having an end wall separating said communicating duct from said main combustion chamber at the other end of said communicating duct and radially directed lateral openings provided in said end wall for the passage of gases therethrough, said insert consisting of at least two members disposed in essentially axial alignment with each other and welded together at the adjacent ends thereof, one of said two members comprising said end wall with said openings, said one member comprising said end wall being made of material of higher grade and heat resistance than the remainder of said insert and being separated from the surrounding cylinder head wall portions by an insulating gap.

2. A precombustion-chamber type diesel engine comprising a main combustion chamber, a precombustion chamber, an insert between said precombustion chamber and said main combustion chamber forming a communicating duct therebetween, said insert having an end wall separating said communicating duct from said main combustion chamber and openings provided in said end wall for the passage of gases therethrough, said insert consisting of at least two members welded together, one of said two members comprising said end wall with said openings, and a cooled cylinder head surrounding said precombustion chamber, said one insert member comprising said end wall freely protruding into said main combustion chamber and being in contact with the cylinder head wall only through the other insert member, said one insert member being made of material of higher grade and higher heat resistance than the remainder of the insert.

3. A precombustion-chamber type diesel engine comprising a main combustion chamber, a precombustion chamber, an insert between said precombustion chamber and said main combustion chamber forming a communicating duct therebetween, said communicating duct being open at one end thereof and in direct free communication thereat with said precombustion chamber, said insert having an end wall separating said communicating duct from said main combustion chamber at the other end thereof and openings provided in said end wall for the passage of gases therethrough, said insert consisting of at least two members welded together, one of said two members comprising said end wall with said openings being made of higher grade material than the other of said two members, said communicating duct having an enlargement directed toward said main combustion chamber and passing over into said enlargement by a flared nozzle-like portion, said openings in said end wall being essentially radially directed outlet openings spaced about the perimeter thereof to connect said enlargement with said main combustion chamber, a fuel injection means directly opening into said precombustion chamber and located on the side of said precombustion chamber opposite said duct for injecting fuel directly into said precombustion chamber in the direction of said duct.

4. A precombustion-chamber type diesel engine comprising a piston and a main combustion chamber formed by a cavity in the piston crown, said piston crown being provided with an additional cavity within said first-mentioned cavity, a precombustion chamber, an insert between said precombustion chamber and said main combustion chamber forming a communicating duct therebetween, fuel injection means on the side of said precombustion chamber opposite said duct for injecting fuel directly into said precombustion chamber and into said duct after passage through said precombustion chamber, said insert having an enlargement directed toward said main combustion chamber and an end wall separating said enlargement from said main combustion chamber, said enlargement being provided with essentially radially directed outlet openings spaced about the periphery thereof connecting said enlargement with said combustion chamber, said end wall projecting into said additional cavity with said piston in the upper dead center position in which said piston crown approaches said end wall so closely as to provide only a small gap within said additional cavity between said crown and said end wall to thereby shield said end wall against the remainder of said main combustion chamber, said insert being formed of two parts welded together, the part of said insert nearer said main combustion chamber being formed of a material of higher heat resistance than the other and being separated from the surrounding wall by an insulating gap.

5. A precombustion-chamber type diesel engine comprising a main combustion chamber, a precombustion chamber, means forming a communicating throttling passage between said precombustion chamber and said main combustion chamber, said precombustion chamber forming an uninterrupted free space of a diameter several times larger than the diameter of said throttling passage, said means being provided with an enlargement in said passage on the side thereof adjacent said main combustion chamber and including an end wall limiting said enlargement and having a partially spherical shape in the direction toward said main combustion chamber thereby defining an at least partially spherical form for said enlargement, essentially radially directed outlet openings spaced about the perimeter of said end wall connecting said enlargement with said main combustion chamber, and an injection nozzle opening into said precombustion chamber on the side opposite said throttling passage to enable a free injection of the fuel jet through said precombustion chamber and said throttling passage into said enlargement, said means being constituted of two parts of different materials welded together, the part of said means forming said enlargement being made of higher grade material than the other part.

6. The precombustion diesel engine according to claim 5, further comprising a piston and a main combustion chamber formed by a cavity in the piston crown and provided with an additional cavity in said crown within said first-mentioned cavity into which said end wall dips in the upper dead center position of said piston, said piston crown approaching said end wall in said upper dead center position so closely as to provide only a small gap within said additional local cavity between said crown and said end wall to thereby shield said end wall against the remainder of said main combustion chamber.

7. The precombustion diesel engine according to claim 5, wherein said means forming said throttling passage is substantially cylindrical and passes over into said enlargement by an essentially nozzle-shaped flaring portion.

8. The precombustion diesel engine according to claim 5, further comprising a cylinder head having a wall forming said precombustion chamber, and said means constituting an insert including at the end thereof opposite said outlet openings a contracted chamber throat and being screw threaded into said precombustion chamber wall with said last-mentioned end, said insert being otherwise insulated against the surrounding cylinder head wall, the part of said insert forming said enlargement adjacent said main combustion chamber and including said end wall being formed of a material of higher heat resistance than the other part and being separated from said cylinder head wall on the outside thereof by an insulating gap.

9. The precombustion diesel engine of claim 5, wherein said outlet openings are cylindrical.

10. The precombustion diesel engine of claim 5, wherein said outlet openings are outwardly enlarged.

11. The precombustion diesel engine of claim 5, wherein said outlet openings are outwardly contracted in the form of a nozzle.

12. A precombustion-chamber type diesel engine comprising a cylinder block provided with a cylinder and a piston reciprocating therein, a cylinder head, a main combustion chamber formed between said piston and said cylinder head, an insert in said cylinder head forming a precombustion chamber, an opening in said cylinder head connecting said precombustion chamber with said main combustion chamber, an annular extension provided on said cylinder head enclosing said opening, an annular extension provided on said first-mentioned insert within said opening and concentrically with said first-named extension and in concentric engagement therewith, and a further insert connected with said first-named insert and enclosing a duct-shaped throttling space open at the end thereof adjacent said precombustion chamber and in free communication therewith and closed at the opposite end thereof by an end wall extending into said main combustion chamber a considerable distance, said further insert being provided with outlet openings in said end wall for the passage of gases therethrough, said further insert being formed of two separate parts welded together, the part of said insert adjacent said main combustion chamber which includes said end wall being formed of a material of higher heat resistance than the other and being separated from said cylinder head wall on the outside thereof by an annular insulating gap and being in contact therewith only through said first-mentioned insert.

13. The precombustion diesel engine according to claim 12, wherein said first-mentioned insert constitutes the main portion of the precombustion chamber and the annular extension thereof is inserted into said opening with an axial gap opposite the wall of said cylinder head surrounding said opening, said axial gap formed between said last-mentioned annular extension and the wall of said cylinder head being in communication with said main combustion chamber through said annular gap.

14. A precombustion-chamber type diesel engine comprising a cylinder block provided with a cylinder and a piston reciprocating therein, a main combustion chamber formed above said piston, a precombustion chamber, and an insert between said precombustion chamber and said main combustion chamber forming a communicating duct therebetween open at the end thereof adjacent said precombustion chamber and in direct communication therewith at said open end, said piston being provided with a recess in the piston crown thereof, said insert having an end wall separating said communicating duct from said main combustion chamber and openings provided in said end wall for the passage of gases therethrough, said end wall extending into said main combustion chamber into said recess in the upper dead center position of said piston, said insert being formed of two members welded together, one of said two members including said end walls with said openings being made of a material of higher heat resistance than the other member of said insert, and an annular insulating gap insulating said one member from the cylinder head walls of said engine, said one member being in heat transferring engagement solely with the other member.

References Cited in the file of this patent

UNITED STATES PATENTS

| | | |
|---|---|---|
| 1,525,776 | French | Feb. 10, 1925 |
| 1,644,517 | Eiermann | Oct. 4, 1927 |
| 1,700,903 | Marburg | Feb. 5, 1929 |
| 1,907,095 | Adams | May 2, 1933 |
| 2,148,505 | Rosen | Feb. 28, 1939 |
| 2,292,409 | Steward | Aug. 11, 1942 |
| 2,316,887 | Pate et al. | Apr. 20, 1943 |
| 2,619,078 | Witsky et al. | Nov. 25, 1952 |
| 2,696,199 | Schmidt et al. | Dec. 7, 1954 |

FOREIGN PATENTS

| | | |
|---|---|---|
| 519,889 | France | June 16, 1921 |
| 883,106 | France | June 24, 1943 |
| 986,326 | France | July 30, 1951 |
| 297,966 | Italy | June 24, 1932 |
| 209,214 | Switzerland | June 17, 1940 |